US010528804B2

(12) United States Patent
Arata et al.

(10) Patent No.: US 10,528,804 B2
(45) Date of Patent: Jan. 7, 2020

(54) DETECTION DEVICE, DETECTION METHOD, AND STORAGE MEDIUM (71) Applicant: Panasonic Intellectual Property Management Co., Ltd., Osaka (JP)

(72) Inventors: Koji Arata, Kanagawa (JP); Makoto Mochizuki, Kanagawa (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 104 days.

(21) Appl. No.: 15/910,051

(22) Filed: Mar. 2, 2018

(65) Prior Publication Data

US 2018/0285635 A1 Oct. 4, 2018

(30) Foreign Application Priority Data

Mar. 31, 2017 (JP) .................................. 2017-070733

(51) Int. Cl.
*G06K 9/00* (2006.01)
*G08B 21/24* (2006.01)
*G01V 8/10* (2006.01)

(52) U.S. Cl.
CPC .......... *G06K 9/00375* (2013.01); *G01V 8/10* (2013.01); *G06K 9/00832* (2013.01); *G08B 21/24* (2013.01)

(58) Field of Classification Search
CPC .......... G06K 9/00375; G06K 9/00355; G06K 9/00832; G01V 8/10; G08B 21/24
See application file for complete search history.

(56) References Cited

U.S. PATENT DOCUMENTS

| 2003/0048926 | A1* | 3/2003 | Watanabe | G06K 9/00362 382/103 |
| 2004/0131254 | A1* | 7/2004 | Liang | A61B 5/1113 382/181 |
| 2008/0031491 | A1* | 2/2008 | Ma | G06K 9/00771 382/103 |
| 2010/0134611 | A1* | 6/2010 | Naruoka | G06K 9/00 348/77 |
| 2011/0026812 | A1* | 2/2011 | Ikeda | G06K 9/3241 382/159 |

(Continued)

FOREIGN PATENT DOCUMENTS

JP 4419672 B 2/2010

*Primary Examiner* — Ming Y Hon
(74) *Attorney, Agent, or Firm* — Greenblum & Bernstein, P.L.C.

(57) ABSTRACT

A detection device includes: an image acquirer that acquires an image of an interior of a vehicle, including a predetermined space; an action determiner that determines whether or not any one of a first action of placing an article or storing the article in the predetermined space and a second action of taking the article or taking out the article from the predetermined space has been performed and which of the first and second actions has been performed when it is determined that any of the first and second actions has been performed, on the basis of the acquired image; an article manager that manages an existence status of the article on the basis of the determination result of the action determiner; and a left-behind article determiner that determines whether or not an article left behind exists in the predetermined space on the basis of the existence status of the article.

9 Claims, 10 Drawing Sheets (56) References Cited

U.S. PATENT DOCUMENTS

| | | | | |
|---|---|---|---|---|
| 2012/0002054 | A1* | 1/2012 | Ohkawa | G06T 1/00 |
| | | | | 348/153 |
| 2012/0288198 | A1* | 11/2012 | Tojo | G06K 9/00771 |
| | | | | 382/173 |
| 2015/0012396 | A1* | 1/2015 | Puerini | G06Q 10/0875 |
| | | | | 705/28 |
| 2015/0085116 | A1* | 3/2015 | Graumann | B60R 1/025 |
| | | | | 348/148 |
| 2015/0221142 | A1* | 8/2015 | Kim | G07C 5/008 |
| | | | | 701/31.5 |
| 2017/0228876 | A1* | 8/2017 | Ebiyama | G06T 7/11 |
| 2017/0299394 | A1* | 10/2017 | Lee | G01C 21/206 |
| 2017/0344854 | A1* | 11/2017 | Behringer | G06F 16/435 |
| 2018/0224849 | A1* | 8/2018 | Gordon | G08B 21/24 |

\* cited by examiner

| ID | Put-on Place (Storage Space) | Put-on Time | Take-out Time |
|---|---|---|---|
| 1 | Glove Box | 2016.12.24 00:12:34 | — |
| ⋮ | ⋮ | ⋮ | ⋮ |

FIG. 5B

| ID | Put-on Place (Storage Space) | Put-on Time | Take-out Time |
|---|---|---|---|
| 1 | Glove Box | 2016.12.24 00:12:34 | 2016.12.24 00:20:05 |
| 2 | Console Box | 2016.12.24 00:14:30 | — |
| ⋮ | ⋮ | ⋮ | ⋮ |

| Storage Space | X Coordinate | Y Coordinate |
|---|---|---|
| Glove Box S1 | 465 | 400 |
| Console Box S2 | 320 | 280 |
| Driver's Door Pocket S3 | 175 | 340 |

FIG. 8B

| Storage Space | X-Axis Direction [cm] | Y-Axis Direction [cm] | Z-Axis Direction [cm] |
|---|---|---|---|
| Glove Box S1 | -38 | -50 | 80 |
| Console Box S2 | 0 | 50 | 95 |
| Driver's Door Pocket S3 | 70 | 15 | 98 |

DETECTION DEVICE, DETECTION METHOD, AND STORAGE MEDIUM

BACKGROUND

1. Technical Field

The present disclosure relates to a detection device for detecting an article left behind in an interior of a vehicle or the like, a detection method, and a storage medium in which a detection program is stored.

2. Description of the Related Art

Recently, a technology of detecting the state of an occupant in a movable body and providing information useful for the occupant on the basis of a detection result. The movable body is a vehicle such as an automobile, for example, and the state of the occupant means an action or a gesture. For example, Japanese Patent No. 4419672 (hereinafter, Patent Literature 1) discloses a technology of performing the following processing to notify the occupant of the presence of an article left behind (hereinafter referred as a left-behind article) when the presence of the left-behind article is determined: an image obtained by shooting the situation in an interior of a vehicle when the occupant is getting on is compared with an image obtained by shooting the situation in the interior when getting off, whether or not the left-behind article is determined.

SUMMARY

The present disclosure provides a detection device capable of detecting a left-behind article in a storage space that cannot be detected through image comparison, a detection method, and a storage medium in which a detection program is stored.

The detection device of the present disclosure detects a left-behind article in a predetermined space in an interior of a vehicle. This detection device includes an image acquirer, an action determiner, an article manager, and a left-behind article determiner. The image acquirer acquires an image of the interior including the predetermined space. On the basis of the acquired image, the action determiner determines whether or not any one of a first action of placing an article or storing the article in the predetermined space and a second action of taking the article or taking out the article from the predetermined space has been performed and which of the first and second actions has been performed when it is determined that any of the first and second actions has been performed. On the basis of a result the determination by the action determiner, the article manager manages an existence status of the article. The existence status shows whether or not the article is placed or stored in the predetermined space. On the basis of the existence status of the article, the left-behind article determiner determines whether or not a left-behind article is present in the predetermined space.

In the detection method of the present disclosure, a left-behind article in a predetermined space in an interior of a vehicle is detected. In this detection method, first, an image of the interior including the predetermined space is acquired. Then, on the basis of the acquired image, it is determined whether or not any one of a first action of placing an article or storing the article in the predetermined space and a second action of taking the article or taking out the article from the predetermined space has been performed and which of the first and second actions has been performed when it is determined that any of the first and second actions has been performed. Then, on the basis of a result of the determination, an existence status of the article is managed. The existence status shows whether or not the article is placed or stored in the predetermined space. Furthermore, on the basis of the existence status of the article, whether or not a left-behind article is present in the predetermined space is determined.

A non-transitory storage medium of the present disclosure stores a detection program. This detection program causes a computer of the detection device for detecting a left-behind article in a predetermined space in an interior of a vehicle to execute a first process to fourth process described below. In the first process, an image of the interior including the predetermined space is acquired. In the second process, on the basis of the acquired image, it is determined whether or not any one of a first action of placing an article or storing the article in the predetermined space and a second action of taking the article or taking out the article from the predetermined space has been performed and which of the first and second actions has been performed when it is determined that any of the first and second actions has been performed. In the third process, on the basis of a result the determination, an existence status of the article is managed. The existence status shows whether or not the article is placed or stored in the predetermined space. In the fourth process, on the basis of the existence status of the article, whether or not a left-behind article is present in the predetermined space is determined.

In the present disclosure, a left-behind article in a storage space that cannot be detected through image comparison can be detected.

DETAILED DESCRIPTION OF THE PREFERRED EMBODIMENTS

Prior to the description of the exemplary embodiment of the present disclosure, a problem of the conventional technology is described briefly. In the technology disclosed in Patent Literature 1, whether or not a left-behind article is present is determined by comparing images of an interior of the vehicle with each other. Therefore, an article of which image when the occupant is getting on is not different from the image when getting off cannot be detected as a left-behind article. For example, an article stored in a storage space such as a glove box does not appear in the images, so that this article cannot be detected as a left-behind article.

Figure 1A:
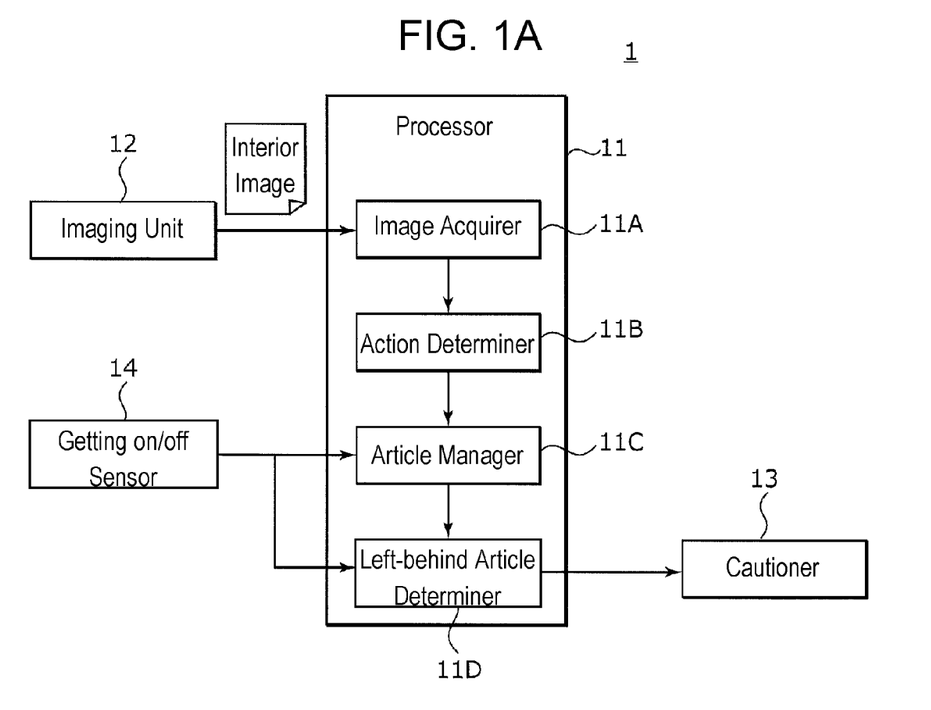
FIG. 1A is a function block diagram showing a configuration example of a left-behind article detection system including a detection device in accordance with an exemplary embodiment of the present disclosure.
Figure 1B:
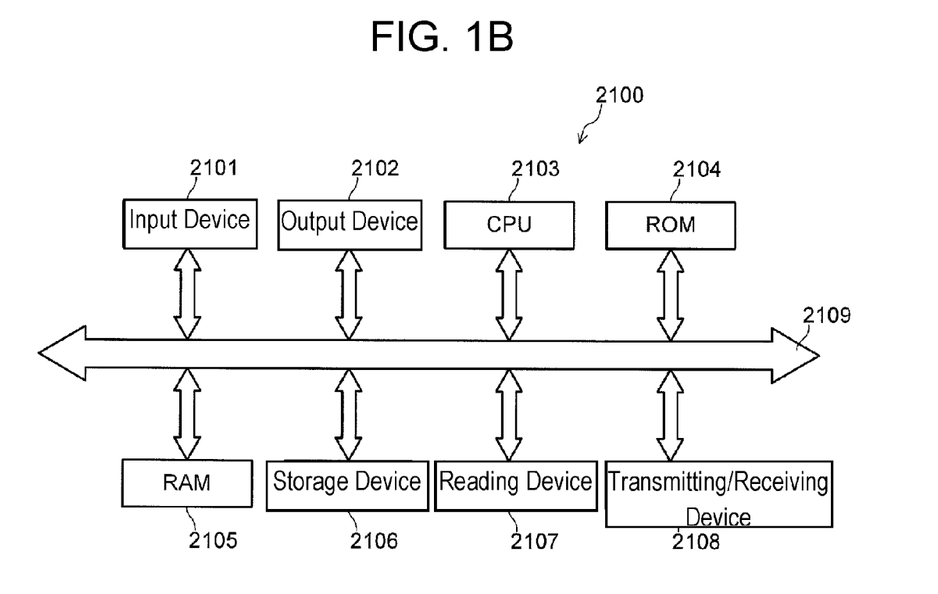
FIG. 1B is a diagram showing an example of a hardware configuration of a computer included in the detection device shown in FIG. 1A.
Figure 2A:
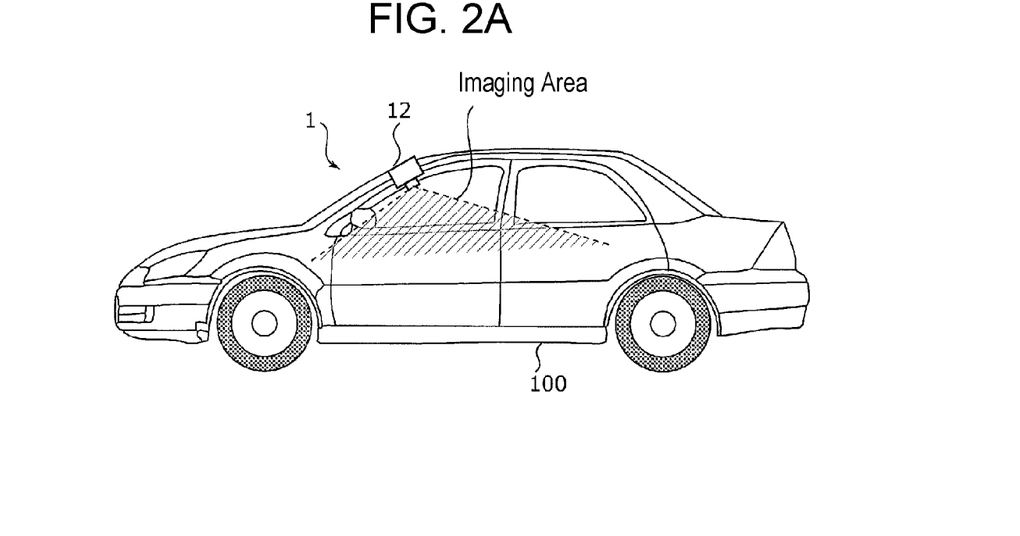
FIG. 2A and FIG. 2B are diagrams showing an installation manner of an in-vehicle camera in an interior of a vehicle.
Figure 2B:
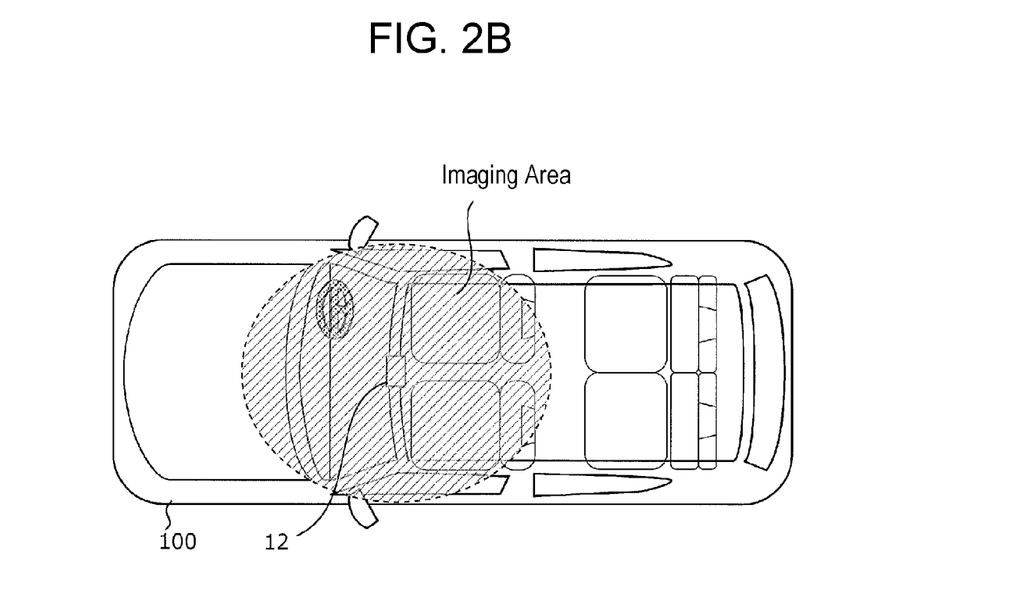

Hereinafter, detection system 1 including a detection device in accordance with the exemplary embodiment of the present disclosure is described in detail with reference to the accompanying drawings. FIG. 1A is a function block diagram showing a configuration example of a left-behind article detection system (hereinafter referred to as "detection system") 1. FIG. 1B is a diagram showing an example of a hardware configuration of a computer included in the detection device shown in FIG. 1A. FIG. 2A and FIG. 2B are diagrams showing an installation manner of imaging unit 12 of detection system 1. FIG. 2A is a perspective side view of vehicle 100, and FIG. 2B is a perspective top view thereof.

Detection system 1 detects a left-behind article in a storage space in the interior of vehicle 100 shown in FIG. 2A and FIG. 2B. Processor 11 of detection system 1 serves as a detection device. Processor 11, for example, may be incorporated in an in-vehicle apparatus mounted in the vehicle, or may be incorporated in an apparatus carried into the vehicle, such as a smartphone.

As shown in FIG. 1A, detection system 1 includes processor 11, imaging unit 12, cautioner 13, and getting on/off sensor 14. Here, as imaging unit 12, cautioner 13, and getting on/off sensor 14, existing equipment in vehicle 100 may be used. As described later, a configuration—including processor 11—related to control can be achieved by computer 2100 shown in FIG. 1B. Components constituting computer 2100 are interconnected via bus 2109.

As shown in FIG. 2A and FIG. 2B, imaging unit 12 is installed in the interior of the vehicle, and includes an infrared camera, for example. Imaging unit 12 may include a camera capable of taking a three-dimensional distance image including the distance to an object (distance information). Imaging unit 12 is installed so that the storage space as a monitoring object of the left-behind article is included in an imaging area of imaging unit 12. In the present exemplary embodiment, for example, imaging unit 12 is installed on the ceiling of the interior and in the center in the vehicle width direction, and shoots the area including the storage spaces existing around the driver seat and passenger seat.

Figure 3:
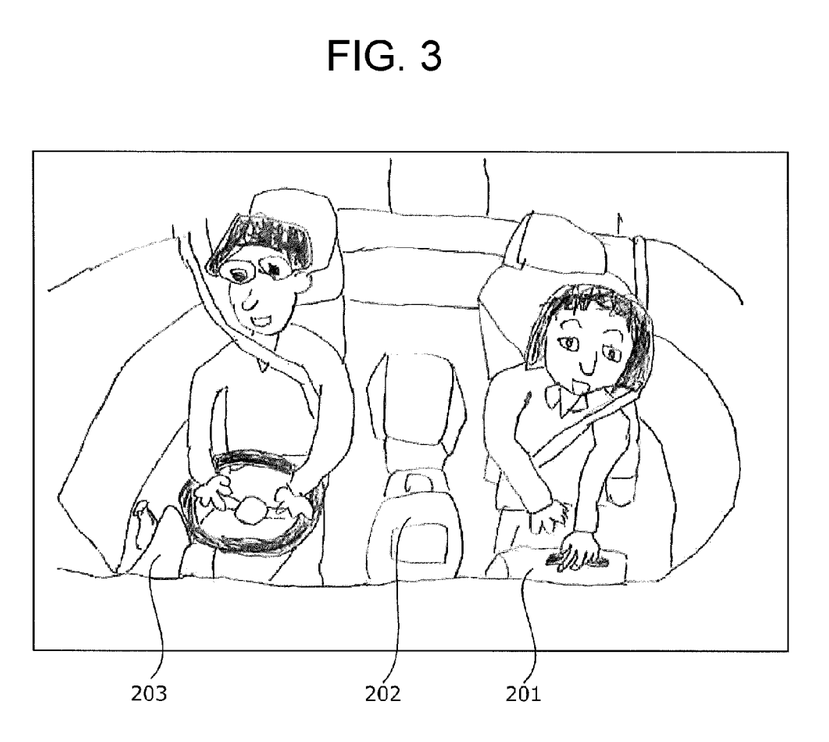
FIG. 3 is a diagram showing an example of an image of the interior taken by the in-vehicle camera.

FIG. 3 is a diagram showing an example of an image of the interior taken by imaging unit 12. FIG. 3 shows the state where occupants are seated on the driver seat and passenger seat. In the image shown by FIG. 3, as an example, storage spaces 201 to 203 are shot. Storage space 201 is a glove box disposed in an instrument panel in front of the passenger seat. Storage space 202 is a console box disposed between the driver seat and passenger seat. Storage space 203 is a driver's door pocket disposed in the door trim on the driver seat side. In many cases, the storage states or existence statuses of articles in storage spaces 201 to 203, namely whether or not the articles are stored in storage spaces 201 to 203, cannot be obtained from the images taken by imaging unit 12. FIG. 3 is a diagrammatic view, but the images taken by imaging unit 12 may be gray scale images or full color images.

Processor 11, as shown in FIG. 1B, includes CPU (Central Processing Unit) 2103 as an arithmetic/control device, and ROM (Read Only Memory) 2104 and RAM (Random Access Memory) 2105 as a main storage device. In ROM 2104, a basic program called BIOS (Basic Input Output System) and basic set data are stored. CPU 2103 reads a program corresponding to a processing content from ROM 2104, develops it in RAM 2105, and executes the developed program, thereby executing a predetermined processing.

Detection system 1 or processor 11, for example, may have storage device 2106 as an auxiliary storage device such as an HDD (Hard Disk Drive) or SSD (Solid State Drive). Furthermore, it may have, as reading device 2107, a disc drive for reading or writing information by driving an optical disc such as a CD (Compact Disc) or DVD (Digital Versatile Disc), a magnetic optical disc such as an MO (Magneto-Optic Disc), or a memory card such as a USB (Universal Serial Bus) memory or an SD (Secure Digital) memory card.

Cautioner 13, for example, includes at least any one of a display device (liquid crystal display or organic EL (light emitting) display), a speaker, and a vibration device. When there is a left-behind article in the interior, cautioner 13 notifies the occupant of the presence of the left-behind article.

Getting on/off sensor 14 detects a getting on action or a getting off action of the occupant. As getting on/off sensor 14, a pressure sensor to be mounted on a seat can be employed, for example. Instead of getting on/off sensor 14, the getting on action and the getting off action of the occupant can be detected on the basis of an image taken by imaging unit 12. Furthermore, a sensor for detecting the getting on action of the occupant and a sensor for detecting the getting off action thereof may be disposed individually.

Processor 11 serves as image acquirer 11A, action determiner 11B, article manager 11C, and left-behind article determiner 11D by executing a detection program stored in ROM 2104, for example. The detection program is provided via a portable, non-transitory, and computer-readable storage medium in which this program is stored, for example. Here, the storage medium includes an optical disc, a magnetic optical disc, or a memory card. The detection program may be provided from a server device storing this program by download via a network, for example. In this case, computer 2100 constituting detection system 1 acquires the program via transmitting/receiving device 2108. Alternatively, each of the components constituting processor 11 may be formed of a dedicated circuit.

Image acquirer 11A acquires an image (hereinafter referred to as "interior image") taken by imaging unit 12. Image acquirer 11A corresponds to input device 2101 in FIG. 1B.

Action determiner 11B determines a movement of an occupant's hand to a storage space, on the basis of the interior image acquired by image acquirer 11A. The movement of the hand includes a first action, a second action, and a third action. The first action is a storing action indicating "placing an article" or "storing an article" in the storage space. The second action is a taking out action indicating "taking an article" or "taking out an article" from the storage space. The third action is an action other than the first action and other than the second action.

In determining the movement of the occupant's hand, on the basis of the interior image acquired by image acquirer 11A, action determiner 11B identifies the state of the occupant's hand existing near the storage space by using a learning model built through machine learning. In other words, action determiner 11B determines whether or not any one of the first action and second action has been performed and which of the first and second actions has been performed when it is determined that any of the first and second actions has been performed. Using the learning model allows action determiner 11B to accurately identify the state of the occupant's hand existing near the storage space.

The learning model is built through a supervised machine learning, for example. As the learning model, for example, an SVM (Support Vector Machine) used for classification into two classes can be employed. The supervised machine learning is preliminarily performed using correct samples and incorrect samples.

Figure 4A:
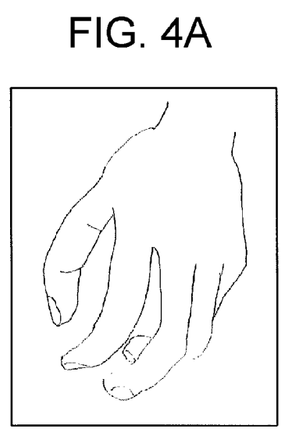
FIG. 4A to FIG. 4E are diagrams showing examples of sample images used in a supervised machine learning.
Figure 4B:
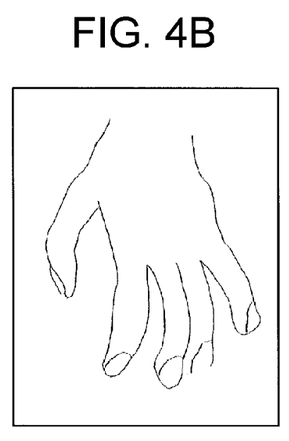
Figure 4C:
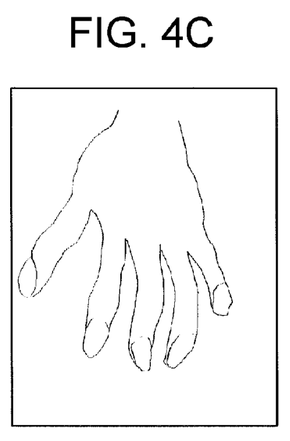
Figure 4D:
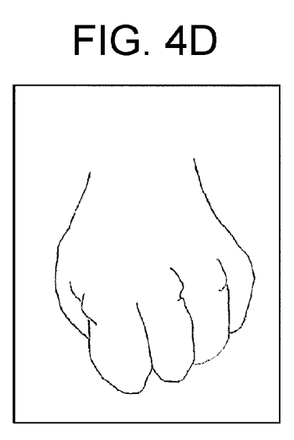
Figure 4E:
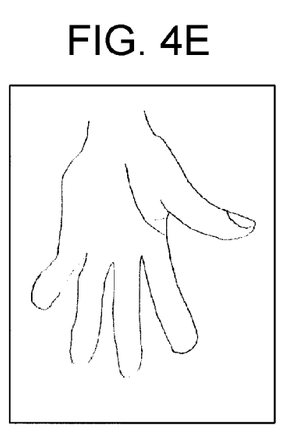

FIG. 4A to FIG. 4E are diagrams showing examples of sample images used in the supervised machine learning. Each of FIG. 4A to FIG. 4C is an example of a correct sample indicating a hand's state when the hand holds an article. As shown in each of FIG. 4A to FIG. 4C, for example, an image in which the palm is directed downward (back side of the paper) and fingers are bent somewhat is employed as a correct sample. Each of FIG. 4D and FIG. 4E is an example of an incorrect sample indicating a hand's state when the hand does not hold an article. As shown in FIG. 4D and FIG. 4E, an image of a clenched hand and an image in which the palm is directed upward (front side of the paper) are employed as the incorrect samples, for example. The incorrect samples include not only an image indicating a hand's state when the hand does not hold an article, but also an image in which no hand is imaged.

The appearance of these correct samples and incorrect samples must be similar to the appearance of the occupant's hand included in the interior image. In other words, in building a learning model, the correct samples and incorrect samples are prepared by assuming the angle and size at which the occupant's hand is imaged from the installation position of imaging unit 12.

By learning a large volume of correct samples and a large volume of incorrect samples, a learning model allowing the identification of a state where a hand holds an article and a state where a hand does not hold an article is built. In other words, the built learning model is used to identify whether the state of the hand included in the input interior image is "state where a hand holds an article" or "state where a hand does not hold an article", and to output the identification result. The learning model is stored in storage device 2106 in FIG. 1B, for example.

Action determiner 11B uses the learning model to identify the state of the hand that is included in the image of each frame acquired by image acquirer 11A. Action determiner 11B determines the movement of the occupant's hand on the basis of a result of the identification. Specifically, action determiner 11B determines whether an action (first action) of storing an article into a storage space has been performed or an action (second action) of taking out an article has been performed.

On the basis of a result of the determination by action determiner 11B, article manager 11C updates an article management list, and manages a storage state of the article in the storage space. The article management list is stored in RAM 2105, for example.

Figure 5A:
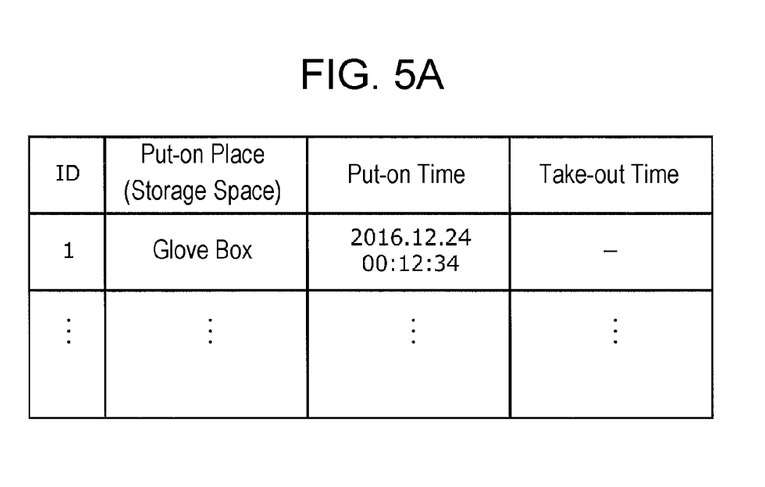
FIG. 5A and FIG. 5B are diagrams showing examples of an article management list.
Figure 5B:
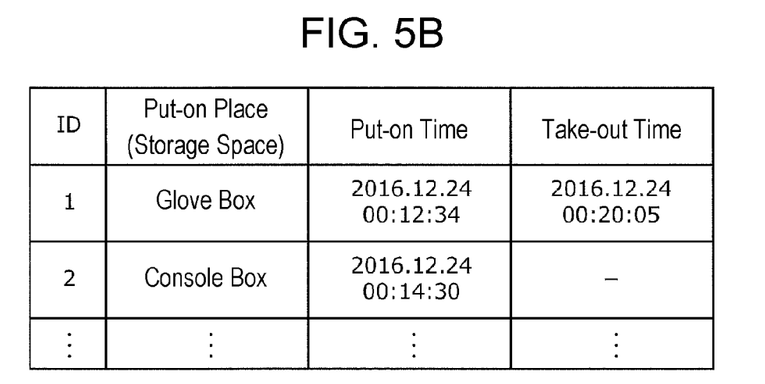

FIG. 5A and FIG. 5B are diagrams showing examples of the article management list. The article management list is a list for managing the storage states of articles in storage spaces in the interior. In the article management list, a place in which an article is placed (type of storage space), a time when an article is placed, and a time when an article is taken out are recorded as storage information in correspondence with an ID. Depending on whether or not information indicating "take-out time" is recorded, the storage states in the storage spaces can be determined.

When an article storing action has been detected near a storage space, information indicating "put-on place" and "put-on time" is recorded in the article management list (see FIG. 5A). When an article taking-out action has been detected near a storage space, information indicating "take-out time" is recorded in the article management list (see FIG. 5B).

In FIG. 5A, in the storage information of the glove box as storage space 201, "put-on time" is recorded, but the information indicating "take-out time" is not recorded. Therefore, FIG. 5A indicates that an article is stored in the glove box. On the other hand, in FIG. 5B, "put-on time" and "take-out time" are recorded as the storage information of the glove box. Therefore, FIG. 5B indicates that an article having been stored in the glove box is taken out and no article is stored in the glove box.

Left-behind article determiner 11D, when an occupant gets off, determines whether or not a left-behind article is present in each storage space by referring to the article management list. Furthermore, when a left-behind article is present, left-behind article determiner 11D commands cautioner 13 to report the presence of a left-behind article. In other words, a signal of commanding the reporting is output to cautioner 13 via output device 2102 in FIG. 1B.

Figure 6:
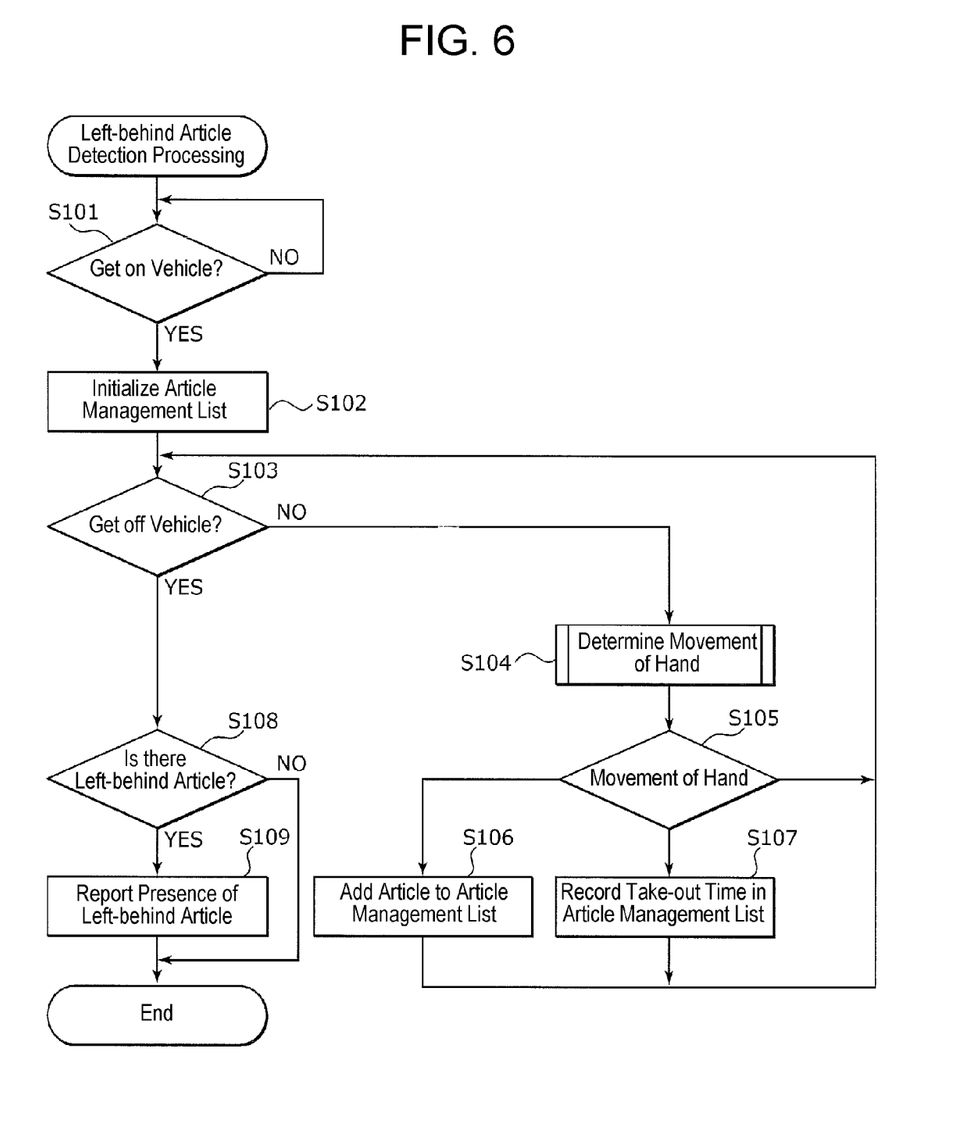
FIG. 6 is a flowchart showing an example of a left-behind article detection processing executed by a processor of the detection device shown in FIG. 1A.

FIG. 6 is a flowchart showing an example of a left-behind article detection processing executed by processor 11 of detection system 1. The left-behind article detection processing is achieved when CPU 2103 executes the detection program in response to a start of detection system 1, for example. Detection system 1 is started in response to unlocking of the door of vehicle 100, for example. Processor 11 may continuously acquire, from getting on/off sensor 14, detection information indicating a getting on/off action of the occupant, or may acquire the detection information just when the detection information changes.

In step S101, processor 11 determines whether or not the occupant has got on vehicle 100 on the basis of the detection information sent from getting on/off sensor 14. When the occupant has got on vehicle 100 ("YES" in step S101), the processing goes to step S102.

In step S102, processor 11 initializes the article management list (serves as article manager 11C). By the initialization, the information that has been recorded in the article management list in the previous left-behind article detection processing is deleted. In the case that a plurality of occupants get on the vehicle, it is desirable to initialize the article management list during the first occupant is getting on vehicle 100. The article management list may be initialized in response to the execution start of the detection program. Alternatively, the article management list may be initialized at the timing of receiving an instruction from a user.

In step S103, processor 11 determines whether or not the occupant is trying to get off vehicle 100, on the basis of the detection information sent from getting on/off sensor 14 (serves as left-behind article determiner 11D). When the occupant is trying to get off the vehicle ("YES" in step S103), the processing goes to step S108. While, when the occupant is not trying to get off the vehicle ("NO" in step S103), the processing goes to step S104. The getting off action of the occupant may be determined on the basis of the stop of a power source (engine or motor) of vehicle 100.

In step S104, on the basis of an interior image from imaging unit 12, processor 11 determines whether or not an occupant's hand has moved to a storage space, specifically whether or not an action of storing an article in the storage space or an action of taking out an article from it has been performed (serves as image acquirer 11A and action determiner 11B).

Figure 7:
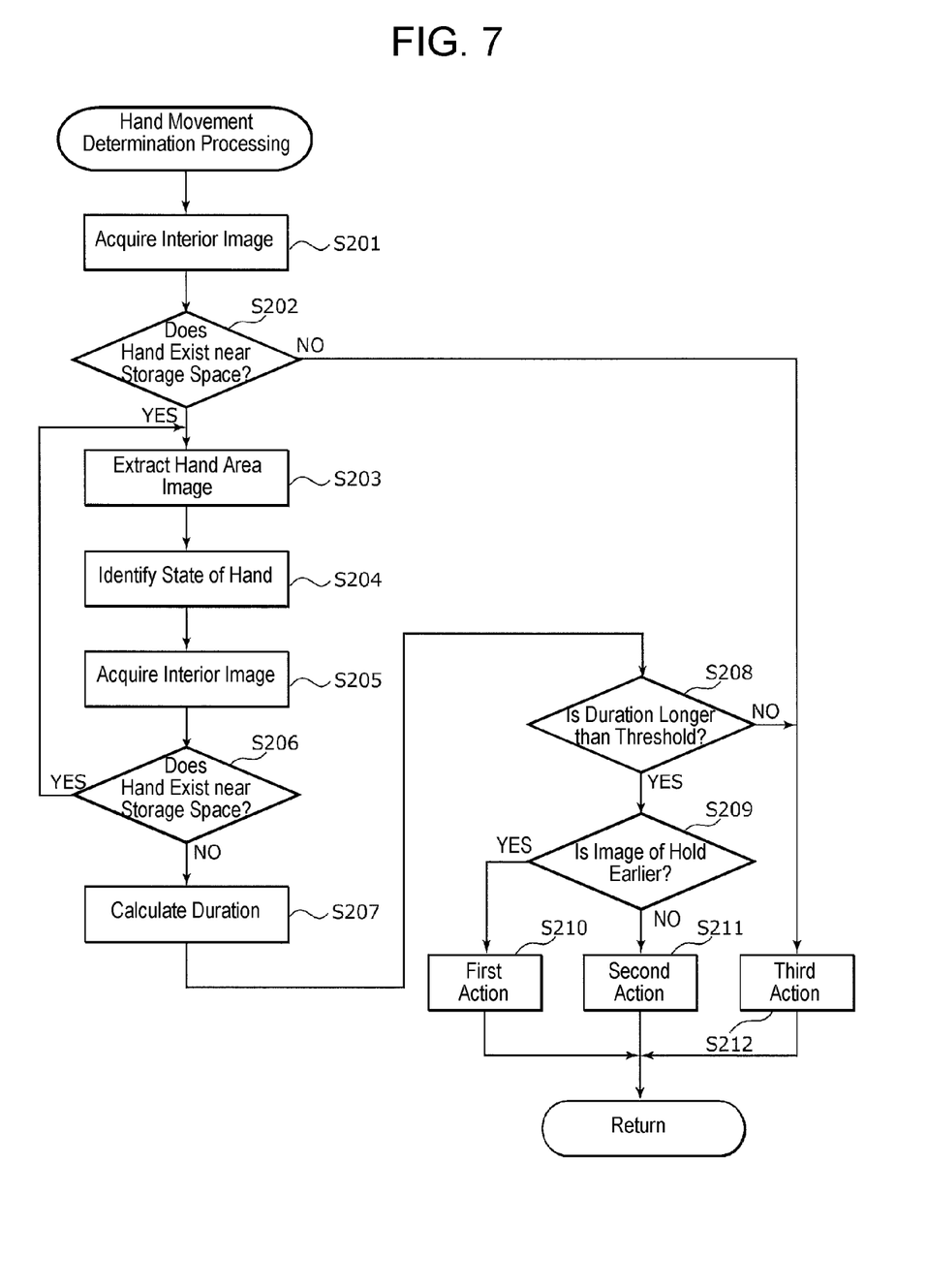
FIG. 7 is a flowchart showing an example of a hand movement determination processing executed by the processor of the detection device shown in FIG. 1A.

The processing of step S104 is performed in accordance with the flowchart of FIG. 7, for example. Steps S201 and S205 in FIG. 7 are processing as image acquirer 11A, and steps S202 to S204 and S206 to S212 are processing as action determiner 11B.

In step S201 in FIG. 7, processor 11 acquires an interior image of one frame from imaging unit 12.

In step S202, processor 11 determines whether or not the occupant's hand exists near the storage space, by comparing the position of the occupant's hand with the position of the storage space. In the case that there is a plurality of storage spaces as monitoring objects for a left-behind article, this determination processing is performed for each storage space. The position of the occupant's hand is determined by the hand area detection using an image recognition technology or by a sensing of a sensor capable of measuring a three-dimensional position. The position of each storage space is preliminarily set as equipment information.

Figure 8A:
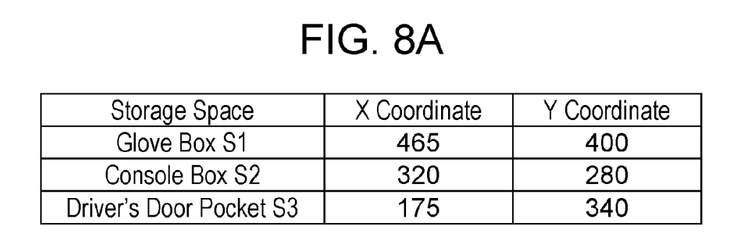
FIG. 8A and FIG. 8B are diagrams showing examples of equipment information of storage spaces.
Figure 8B:
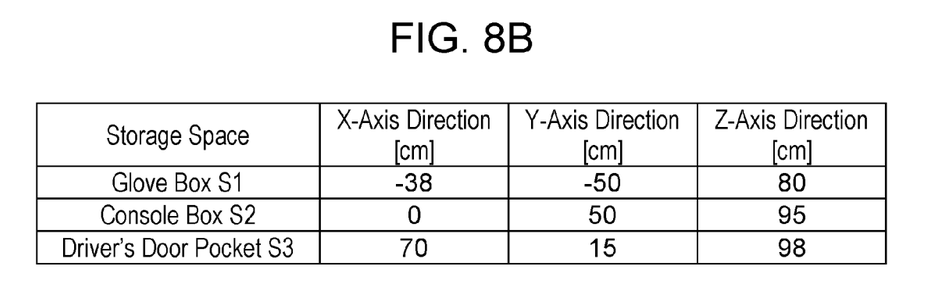

FIG. 8A and FIG. 8B show examples of the equipment information. In FIG. 8A, the positions of storage spaces 201 to 203 are managed using two-dimensional coordinates of representative points (center points of storage spaces 201 to 203) in the interior image. In FIG. 8B, the positions of storage spaces 201 to 203 are managed using three-dimensional positions with respect to the installation position of imaging unit 12 as an origin.

For example, the distance from the position coordinates of the skeleton of the occupant's hand to the two-dimensional coordinates of any one of storage spaces 201 to 203 is within 50 pixels; or the distance from the three-dimensional position of the occupant's hand to the three-dimensional position of any one of storage spaces 201 to 203 is within 15 cm, it is determined that an occupant's hand exists near storage spaces 201 to 203 when the following condition is satisfied.

When the hand exists near a storage space ("YES" in step S202), the processing goes to step S203. On the other hand, when the hand does not exist near the storage space ("NO" in step S202), the processing goes to step S212, and the movement of the hand is determined to be the third action that is neither the storing action nor the taking out action.

In step S203, processor 11 extracts an area (hereinafter referred to as "hand area image") including the occupant's hand from the interior image. For extracting the hand area image, a known image recognition technology can be used.

In step S204, processor 11 uses the learning model to identify whether the state of the hand included in the hand area image is "state where a hand holds an article" or "state where a hand does not hold an article". When the hand area image has a feature similar to a correct sample, the hand state is identified as "state where a hand holds an article". When the hand area image has a feature similar to an incorrect sample, the hand state is identified as "state where a hand does not hold an article". The identification result may be temporality stored in RAM 2105, for example.

In some cases, the identification result of "state where a hand holds an article" or "state where a hand does not hold an article" changes due to a noise or imaging angle of the interior image. Therefore, smoothing the identification result may be executed.

In step S205, processor 11 acquires the interior image of the next frame from imaging unit 12.

In step S206, processor 11 determines whether or not the hand exists near the storage space. This processing is the same as that in step S202. When the hand exists near the storage space ("YES" in step S206), the processing goes to step S203, and the state of the hand in the interior image is identified. When the hand remains near the storage space, the processing of steps S203 to S206 is repeated. On the other hand, when the hand does not exist near the storage space ("NO" in step S206), namely when the hand separates from the proximity of the storage space, the processing goes to step S207.

In step S207, processor 11 calculates the duration of "state where a hand holds an article" and the duration of "state where a hand does not hold an article". The duration is indicated by the number of frames that continuously show the same identification result, for example.

Figure 9:
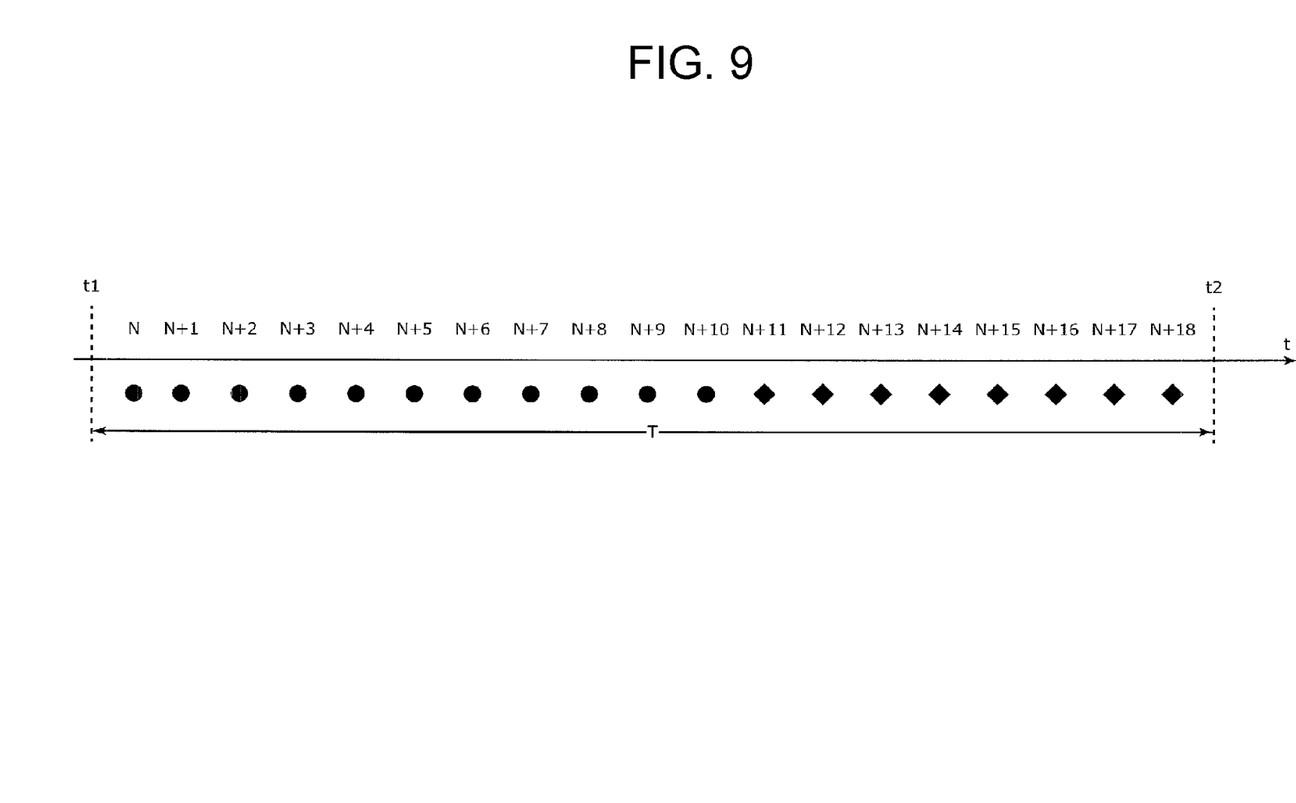
FIG. 9 is a diagram showing an example of an identification result of a hand area image in interval T in which an occupant's hand exists near the storage space.

FIG. 9 shows an example of the identification result of the hand area image in time interval T in which an occupant's hand exists near a storage space. Interval T in which the occupant's hand exists near the storage space means the period from timing t1 when the occupant's hand is first determined to exist near the storage space ("YES" in step S202 in FIG. 7) to timing t2 when the occupant's hand separates from the storage space ("NO" in step S206 in FIG. 7).

N to N+18 are frame numbers. Symbol "●" shown in association with a frame number indicates that the state of the hand included in the frame is identified as "state where a hand holds an article". Symbol "♦" indicates that the state of the hand included in the frame is identified as "state where a hand does not hold an article". In the example of FIG. 9, the state of the hand in each of frames N to N+10 is identified as "state where a hand holds an article", and the state of the hand in each of frames N+11 to N+18 is identified as "state where a hand does not hold an article". In this case, the duration of "state where a hand holds an article" is 11 frames and the duration of "state where a hand does not hold an article" is 8 frames.

In step S208 in FIG. 7, processor 11 compares a predetermined threshold for determining the movement of the occupant's hand with each of the durations calculated in step S207, and determines whether any duration is longer than the threshold. The threshold means the duration in which the occupant's hand is assumed to exist near the storage space when an article is placed or taken out. The threshold may be set at a different value for each storage space. When the duration of any one of "state where a hand holds an article" and "state where a hand does not hold an article" is longer than the threshold ("YES" in step S208), the processing goes to step S209. While, when both durations are equal to or shorter than the threshold ("NO" in step S208), the processing goes to step S212, and the movement of the hand is determined to be the third action that is neither the storing action nor the taking out action.

In step S209, processor 11 determines which of the continuation interval of "state where a hand holds an article" and the continuation interval of "state where a hand does not hold an article" is earlier in interval T in which the occupant's hand exists near the storage space (see FIG. 9). When the continuation interval of "state where a hand holds an article" is earlier ("YES" in step S209), the processing goes to step S210. When the continuation interval of "state where a hand does not hold an article" is earlier ("NO" in step S209), the processing goes to step S211. In other words, processor 11 determines whether the storing action and the taking out action are performed, on the basis of the chronological order of the states of the hand near the storage space.

In step S210, processor 11 determines that the movement of the hand is the first action (storing action) indicating "placing an article" because the occupant's hand approaches the storage space while holding an article and separates from the storage space while holding no article.

In step S211, processor 11 determines that the movement of the hand is the second action (taking out action) indicating "taking out an article" because the occupant's hand approaches the storage space while holding no article and separates from the storage space while holding an article.

Thus, the movement of the occupant's hand is determined to be any one of the first action (storing action), the second action (taking out action), and the third action (action other than the storing action and other than the taking out action).

The description is continued back to FIG. 6. In step S105, processor 11 determines a next process on the basis of the determination result of the movement of the hand. When the movement of the hand is the first action, the processing goes to step S106. When the movement of the hand is the second action, the processing goes to step S107. When the movement of the hand is the third action, the article management list is not updated, and the processing goes to step S103.

In step S106, processor 11 adds, to the article management list (see FIG. 5A and FIG. 5B), the storage space as the object of the storing action and the time when an article is placed (serves as article manager 11C). Incidentally, when a storing action is detected for a storage space, and then the storing action is detected again for the same storage space without detection of a taking out action, two pieces of storage information showing that the put-on times for the same storage space are different from each other are recorded in the article management list.

In step S107, processor 11 specifies, from the article management list, the storage information about the storage space for which the taking out action is detected, and adds the take-out time to the article management list (serves as article manager 11C). Incidentally, when the storage information about the storage space for which the taking out action has been detected is not recorded, the article management list is not updated. In addition, when there is a plurality of pieces of storage information about the storage space for which the taking out action has been detected, the storage information is updated in accordance with a predetermined condition. For example, the storage information in which the article placing time is the latest may be updated, or the storage information in which the article placing time is the earliest may be updated.

Until the getting off action of the occupant is detected in step S103, the article management list is updated in the processing of steps S104 to S107. When the getting off action of the occupant is detected in step S103, the processing goes to step S108.

In step S108, processor 11 determines whether or not a left-behind article exists in each storage space, by referring to the article management list (see FIG. 5A and FIG. 5B) managed by article manager 11C (serves as left-behind article determiner 11D). When an article of which take-out time is not recorded exists in the article management list, namely when an article that has been placed in the storage space but has not been taken out exists in the article management list, it is determined that a left-behind article is present in this storage space. When a left-behind article is present in the storage space, the processing goes to step S109. When no left-behind article is present in the storage space, the left-behind article detection processing is completed.

Figure 10:
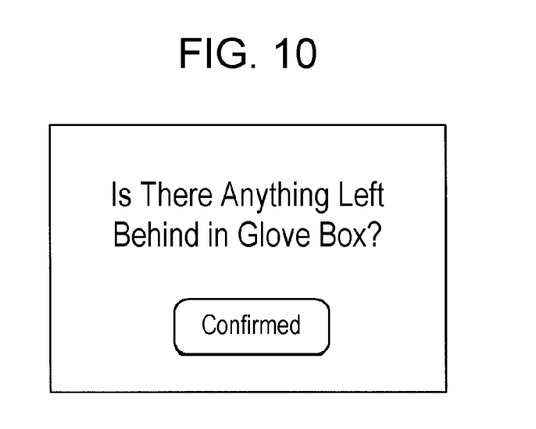
FIG. 10 is a diagram showing an example of a caution screen that indicates the presence of a left-behind article and is displayed by a cautioner of the detection device shown in FIG. 1A.

In step S109, processor 11 outputs, to cautioner 13, caution information for reporting the presence of a left-behind article (serves as left-behind article determiner 11D). The caution information includes the type of the storage space storing the left-behind article. Cautioner 13 notifies the occupant of the presence of the left-behind article. For example, as shown in FIG. 10, cautioner 13 displays a caution screen that includes a message for encouraging the occupant to make sure there is no left-behind article. Thus, the occupant can know the presence of an article left in the storage space. The presence of a left-behind article may be reported by display as shown in FIG. 10, or may be reported by voice or vibration.

As described above, processor 11 (detection device) of detection system 1 detects a left-behind article in a storage space (predetermined space) in the interior of a vehicle. Processor 11 includes image acquirer 11A, action determiner 11B, article manager 11C, and left-behind article determiner 11D. Image acquirer 11A acquires an interior image including the storage space. On the basis of the interior image, action determiner 11B determines whether or not any one of the first action of placing an article (or storing an article) in the storage space and the second action of taking an article (or taking out an article) from the storage space has been performed and which of the first and second actions has been performed when it is determined that any of the first and second actions has been performed. On the basis of the determination result of action determiner 11B, article manager 11C manages the storage state of the article in the storage space (or existence status of the article). On the basis of the storage state of the article, left-behind article determiner 11D determines whether a left-behind article is present in the storage space. The existence status of the article shows whether or not the article is placed or stored in the predetermined space.

In the detection method of the present exemplary embodiment, a left-behind article in a storage space (predetermined space) in an interior of a vehicle is detected. In this method, first, an interior image including the storage space is acquired (steps S201 and S205 in FIG. 7). Then, on the basis of the interior image, it is determined whether or not any one of the first action of placing an article (or storing an article) in the storage space and the second action of taking an article (or taking out an article) from the storage space has been performed and which of the first and second actions has been performed when it is determined that any of the first and second actions has been performed (steps S202 to S204 and S206 to S212 in FIG. 7). Then, on the basis of the determination result, the storage state of the article in the storage space (or existence status of the article) is managed (steps S106 and S107 in FIG. 6). Furthermore, on the basis of an existence status of the article, whether a left-behind article is present in the storage space is determined (steps S108 and S109 in FIG. 6).

The detection program of the present exemplary embodiment causes processor 11 (computer) of detection system 1, which detects a left-behind article in a storage space (predetermined space) in the interior, to execute a first process to fourth process described below. In the first process, an interior image including the storage space is acquired (steps S201 and S205 in FIG. 7). In the second process, on the basis of the interior image, it is determined whether or not any one of the first action of placing an article (or storing an article)

in the storage space and the second action of taking an article (or taking out an article) from the storage space has been performed (steps S202 to S204 and S206 to S212 in FIG. 7) and which of the first and second actions has been performed when it is determined that any of the first and second actions has been performed. In the third process, on the basis of the determination result of the second process, the storage state of the article in the storage space (or existence status of the article) is managed (steps S106 and S107 in FIG. 6). In the fourth process, on the basis of the storage state of the article, whether or not a left-behind article in present in the storage space is determined (steps S108 and S109 in FIG. 6). This detection program can be provided in the manner that it is stored in a non-transitory and computer-readable storage medium.

On the basis of the movement of the occupant's hand to a storage space, detection system 1 manages the storage state of an article in the storage space and determines whether or not the article is present. Therefore, detection system 1 can detect a left-behind article in the storage space that cannot be detected through image comparison.

Thus, the present disclosure has been described specifically on the basis of the exemplary embodiment. However, the present disclosure is not limited to the above-mentioned exemplary embodiment, but can be modified without departing from the scope.

For example, the predetermined space as an object of left-behind article detection is not limited to storage spaces such as a glove box, but may include a drink holder or a storage place for a small article on a dashboard.

Figure 11A:
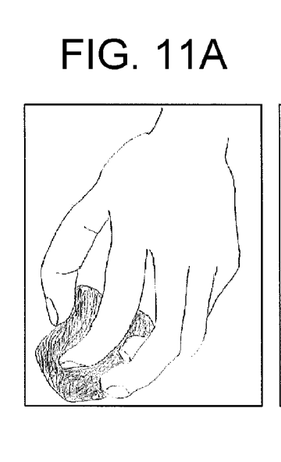
FIG. 11A to FIG. 11C are diagrams showing other examples of sample images used in a supervised machine learning.
Figure 11B:
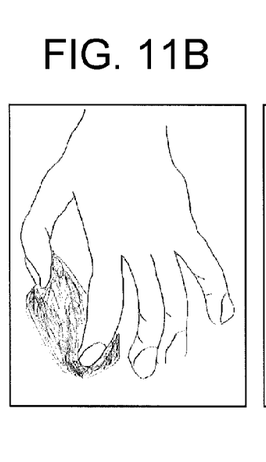
Figure 11C:
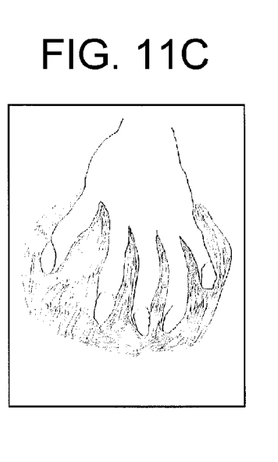

Furthermore, for example, a learning model used for identifying the hand's state may be a model learned by a method (for example, CNN (Cellular Neural Network)) other than the SVM. In building the learning model, an image including an image of an article may be used as a correct sample as shown in FIG. 11A to FIG. 11C.

In the above-mentioned exemplary embodiment, when an action of taking out an article from a storage space is detected, the take-out time is recorded in the article management list. However, when an action of taking out an article is detected, the storage information is deleted. In this case, the article that is still recorded in the article management list when the occupant is getting off is determined as a left-behind article.

Furthermore, by identifying not only the hand's state but also the hand's shape using the learning model, the type of the placed article or taken out article may be estimated and the type of the article may be also recorded in the article management list. In this case, when a left-behind article is present, the type of the left-behind article can be also reported to the occupant. Therefore, the convenience is further enhanced.

Furthermore, whether a left-behind article is present may be determined not when the occupant is getting off, but at the timing of receiving an instruction from a user, for example. This method is useful when the user searches for the article of which location is unknown, for example. Furthermore, the article management list may be initialized at the timing of receiving an instruction from a user. This processing can be easily achieved by allowing "start of left-behind article management" or "left-behind article determination" to be selected from the screen, for example.

In the exemplary embodiment, processor 11 (computer) serves as image acquirer 11A, action determiner 11B, article manager 11C, and left-behind article determiner 11D, thereby achieving the present disclosure. However, a part or the whole of these functions can be formed of electronic circuits such as a DSP (Digital Signal Processor), ASIC (Application Specific Integrated Circuit), and PLD (Programmable Logic Device).

It must be considered that the exemplary embodiment shows examples in all aspects and is not restrictive. The scope of the present disclosure is shown by not the above-mentioned description but the scope of the claims, and intends to include a means equivalent to the scope of the claims and include all modifications within the scope.

As described hereinbefore, the present disclosure is appropriate for a detection device, a detection method, and a detection program for detecting a left-behind article in an interior of a vehicle or the like.

What is claimed is:

1. A detection device for detecting an article left behind in a predetermined space in an interior of a vehicle, the detection device comprising:
   a memory that stores instructions; and
   a processor that, when executing the instructions stored in the memory, performs operations including:
   acquiring an image of the interior including the predetermined space;
   determining, based on the image, whether or not one of a first action of placing an article or storing the article in the predetermined space and a second action of taking the article or taking out the article from the predetermined space has been performed, and which of the first and second actions has been performed when it is determined that one of the first and second actions has been performed;
   managing, based on a result of the determination, an existence status of the article; and
   determining, based on the existence status of the article, whether or not the article left behind is present in the predetermined space,
   wherein the existence status shows whether or not the article is placed or stored in the predetermined space,
   wherein the processor further performs operations including:
   identifying, from the image, a state of a person's hand by using a model built through machine learning, the state of the person's hand indicating whether or not the person's hand holds the article, and
   wherein it is determined, based on a result of the identification of the state of the person's hand, whether or not one of the first action and the second action has been performed and which of the first and second actions has been performed when it is determined that one of the first and second actions has been performed.

2. The detection device according to claim 1, wherein the state of the person's hand indicates one of a first state indicating that the person's hand holds the article and a second state indicating that the person's hand does not hold the article, and
   it is determined, based on a duration of each of the first and second states and a chronological order of the first and second states, whether or not one of the first action and the second action has been performed and which of the first and second actions has been performed when it is determined that of the first and second actions has been performed.

3. The detection device according to claim 1, wherein the predetermined space includes at least one of a glove box, a console box, and a door pocket.

4. The detection device according to claim 1, wherein
when it is determined that the article left behind is present in the predetermined space, the processor notifies the person of the presence of the article left behind.

5. A detection device according to claim 1, wherein,
in the identifying of the state of the person's hand, the state of the person's hand is identified without detecting a presence of the article from the image.

6. A detection device according to claim 1, wherein
the state of the person's hand includes at least one of an orientation or a size of the person's hand.

7. A detection device according to claim 1, wherein
the model built through machine learning includes a first hand image corresponding to a first state of a hand that holds the article, and a second hand image corresponding to a second state of a hand that does not hold the article, and
in the identifying of the state of the person's hand, it is determined whether a feature of an image of the person's hand in the acquired image is closer to a feature of the first hand image or a feature of the second hand image, to identify the state of the person's hand.

8. A detection method of detecting an article left behind in a predetermined space in an interior of a vehicle, the detection method comprising:
  acquiring an image of the interior including the predetermined space;
  determining, based on the image, whether or not one of a first action of placing an article or storing the article in the predetermined space and a second action of taking the article or taking out the article from the predetermined space has been performed and which of the first and second actions has been performed when it is determined that one of the first and second actions has been performed;
  managing, based on a result of the determination, an existence status of the article; and
  determining, based on the existence status of the article, whether or not the article left behind is present in the predetermined space,
  wherein the existence status shows whether or not the article is placed or stored in the predetermined space,
  wherein the method further comprises:
  identifying, from the image, a state of a person's hand by using a model built through machine learning, the state of the person's hand indicating whether or not the person's hand holds the article, and
  wherein it is determined, based on a result of the identification of the state of the person's hand, whether or not one of the first action and the second action has been performed and which of the first and second actions has been performed when it is determined that one of the first and second actions has been performed.

9. A non-transitory computer-readable storage medium storing a detection program to be executed by a computer of a detection device for detecting an article left behind in a predetermined space in an interior of a vehicle,
  wherein the detection program causes the computer to execute operations including:
  acquiring an image of the interior including the predetermined space;
  determining, based on the image, whether or not any one of a first action of placing an article or storing the article in the predetermined space and a second action of taking the article or taking out the article from the predetermined space has been performed and which of the first and second actions has been performed when it is determined that one of the first and second actions has been performed;
  managing, based on a result of the determination in the second process, an existence status of the article; and
  determining, based on the existence status of the article, whether or not the article left behind is present in the predetermined space,
  wherein the existence status shows whether or not the article is placed or stored in the predetermined space,
  wherein the detection program further causes the computer to execute operations including:
  identifying, from the image, a state of a person's hand by using a model built through machine learning, the state of the person's hand indicating whether or not the person's hand holds the article, and
  wherein it is determined, based on a result of the identification of the state of the person's hand, whether or not one of the first action and the second action has been performed and which of the first and second actions has been performed when it is determined that one of the first and second actions has been performed.

* * * * *